Sept. 8, 1925.
C. R. IRISH
AUTOMOBILE BODY SUPPORT
Filed March 2, 1921
1,552,702
2 Sheets-Sheet 1
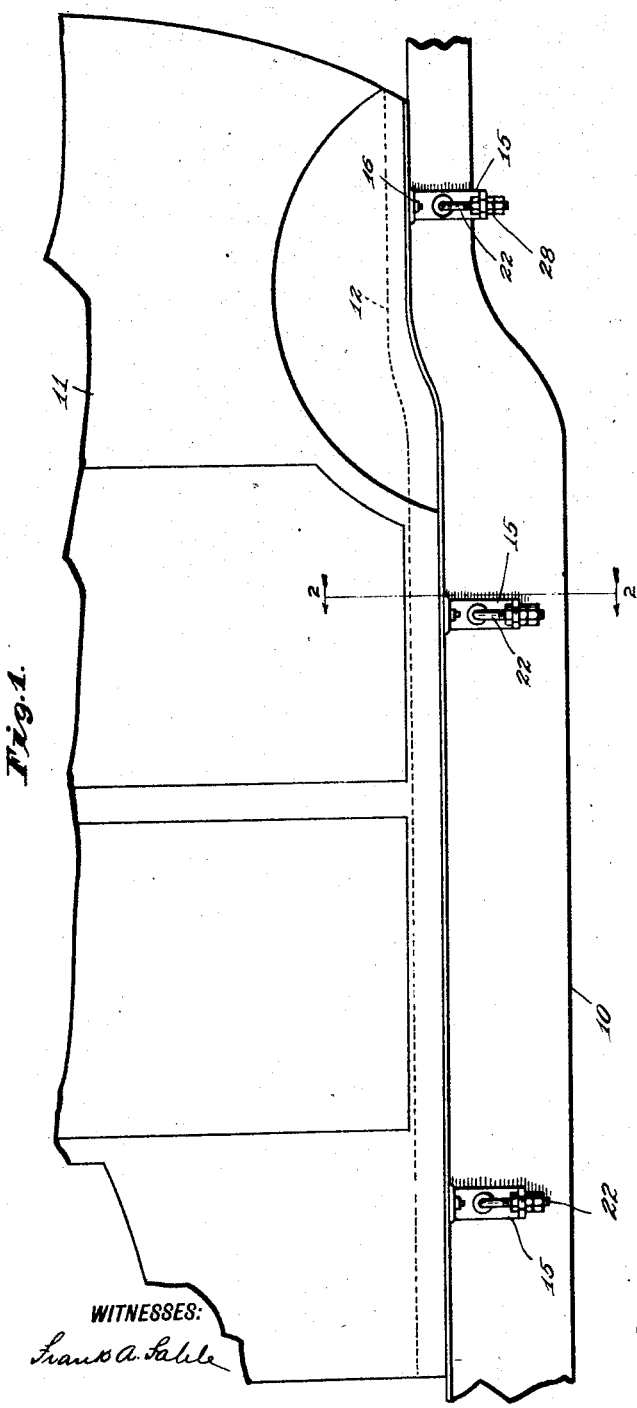
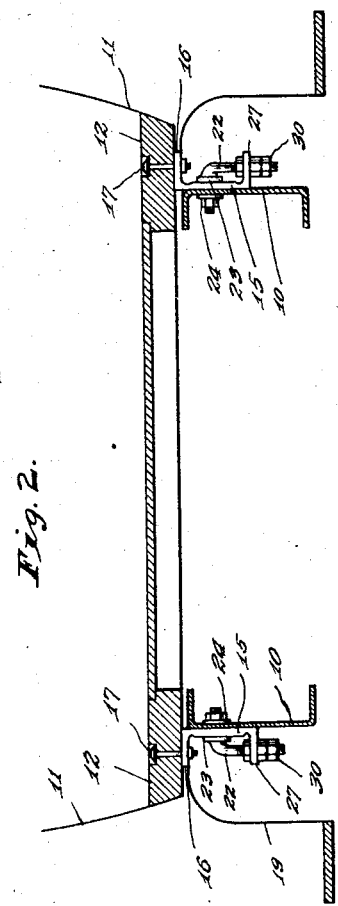
INVENTOR
Clarence R Irish,
BY
ATTORNEYS Sept. 8, 1925.  
C. R. IRISH  
1,552,702

AUTOMOBILE BODY SUPPORT

Filed March 2, 1921   2 Sheets-Sheet 2

Witnesses  
Frank A. Fahle

Inventor  
Clarence R. Irish,  
By Hood Ashby  
Attorneys

Patented Sept. 8, 1925.

1,552,702

UNITED STATES PATENT OFFICE.

CLARENCE R. IRISH, OF INDIANAPOLIS, INDIANA.

AUTOMOBILE BODY SUPPORT.

Application filed March 2, 1921. Serial No. 449,112.

*To all whom it may concern:*

Be it known that I, CLARENCE R. IRISH, a citizen of the United States, residing at Indianapolis, in the county of Marion and State of Indiana, have invented a new and useful Automobile Body Support, of which the following is a specification.

In building automobile bodies, especially closed bodies, and mounting them on the chassis, considerable difficulty is experienced because of the twisting or other distortion of the body. The body is ordinarily constructed while supported on carefully leveled saw-bucks, which are frequently tested to see that they are level. The chassis is hardly ever level. On the contrary, as by reason of heating and other operations in manufacture no two chassis frames are ever exactly alike and almost all of them are out of level. As a result, when the built body is transferred from the saw-bucks to the chassis frame, the body has been twisted and distorted, as the longitudinal sills which support the body at each side have usually rested directly on top of the longitudinal side members or channels of the chassis frame and have bent to conform to the shape of such side members. The distortion thus produced is often sufficient to make it impossible to open or close the doors.

It is the object of my invention to provide a simple and effective arrangement for leveling an automobile body and preventing it from twisting or being otherwise distorted, regardless of how the chassis frame may be twisted.

Figure 3:
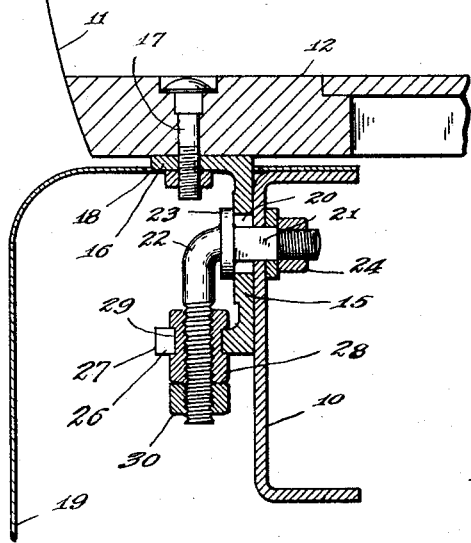
Figure 4:
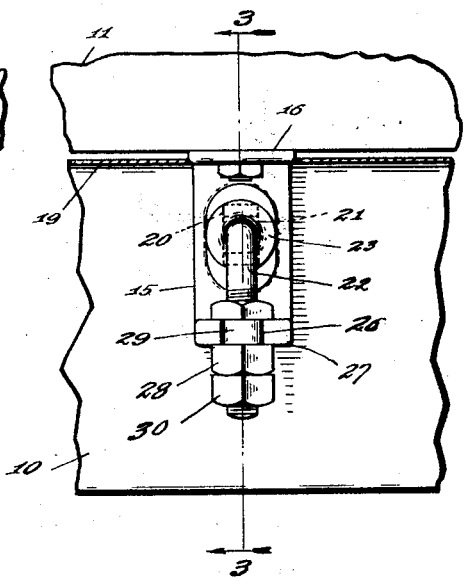
Figure 5:
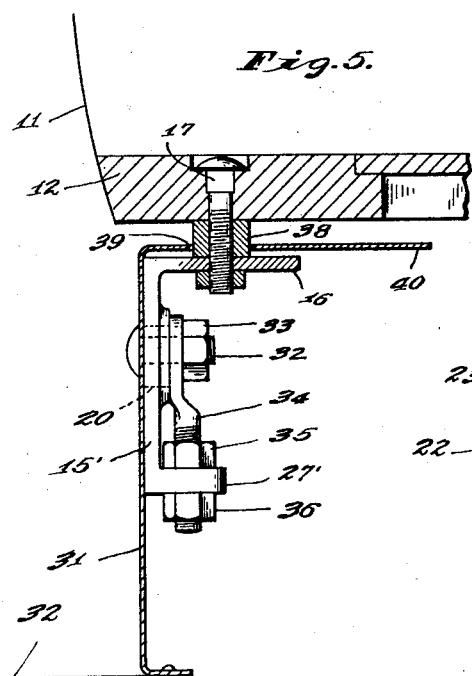
Figures 6, 7:
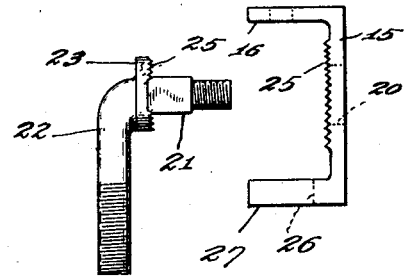

The accompanying drawings illustrate my invention: Fig. 1 is a fragmentary side elevation of a chassis and car body, showing how the body is adjustably supported on the frame in accordance with my invention, the apron and running board of the car being removed; Fig. 2 is a section on the line 2—2 of Fig. 1; Fig. 3 is an enlarged detail of the left-hand part of Fig. 2, and is a section on the line 3—3 of Fig. 4; Fig. 4 is an elevation of the structure shown in Fig. 3, with the apron in section; Fig. 5 is a sectional view similar to Fig. 3, showing a modified structure which is used when the car has no apron separate from the chassis frame itself; and Figs. 6 and 7 are two detail views showing a modified form of bolt and bracket in which the engaging faces are toothed.

Referring first to the arrangement shown in Figs. 1 to 4 inclusive, the chassis frame has the usual side members 10, usually channels, and above the chassis is the car body 11 which is carried by its usual longitudinal sills 12 which support the weight of the rest of the body. It is these sills 12 which ordinarily heretofore have rested directly on the channels 10.

Instead of that arrangement, however, I provide brackets 15 which bear against a vertical face of the side members 10—the outer face in Figs. 1 to 4 inclusive—which brackets have at the top horizontal flanges 16 upon which the sills 12 directly rest and to which they are fastened by carriage bolts 17. There may be any suitable number of these brackets 15, but usually three on each side will be sufficient, as indicated in Fig. 1. These brackets extend through holes 18 in the horizontal upper parts of the aprons 19 when such aprons are provided, the aprons being supported from the upper faces of the channels 10. The vertical part of each bracket 15 is provided with a vertically elongated rectangular hole 20, through which projects the squared shank 21 of a right-angle bolt 22 which is threaded at both ends and is provided at an intermediate point with an enlargement or collar 23 which bears against the outer face of the vertical portion of the bracket 15 at the hole 20. A nut 24 on the threaded end of the horizontal portion of the angle bolt 22 cooperates with the enlargement or collar 23 to clamp the bracket 15 to the channel 10 in any vertical position to which the bracket may be adjusted. The meeting faces of the enlargement or collar 23 and the bracket 15 may be plain faces, as indicated in Fig. 3, or may be provided with engaging teeth 25 as indicated in Figs. 6 and 7. The vertical part of the angle bolt 22 extends downward through a slot or hole 26 in a lower horizontal flange 27 of the bracket. I prefer a slot, for assembling purposes. A nut 28 on the threaded vertical part of the angle bolt cooperates with the flange 27 to raise or lower the bracket 15, and thereby to raise or lower the corresponding part of the sill 12, when the nut 24 is loosened; the nut 24 is tightened after the proper adjustment has been obtained. The nut 28 is preferably an elongated nut extending both above and below the flange 27 and provided with a circumferential groove 29 which interlocks with the slot 26. This holds the two parts 27 and 28 in definite vertical relation, and permits the nut 28 to be operated as a whole by a socket wrench put on it at the lower end. If desired, a lock nut 30 may be provided beneath the nut 28, for clamping it in adjusted position.

By loosening the several nuts 24 of the brackets the nuts 28 may be adjusted to produce the proper leveling of the sills 12, and thereby of the whole body 11. Not only can this be done in the initial mounting of the body, but it can be done subsequently to correct any distortion which may be produced by use or abuse of the car. When the proper adjustment has been obtained, the nut 24 is tightened to clamp the parts in the adjusted position; and the nut 30, if provided, is tightened to prevent possibility of turning of the nut 28.

When there is no apron 19 provided, it is preferable to put the brackets on the inner faces of the side members 31 which are provided in such cases, which side members usually support the running boards 32 at their lower edges. This construction is illustrated in Fig. 5, which also shows some other modifications. Here the bracket 15' is clamped to the inner face of the side member 31 by an ordinary bolt 32, with its clamping nut 33, and from this bolt 32 depends an eye bolt 34 which passes through a hole in the horizontal flange 27' of the bracket 15' and carries clamping nuts 35 and 36 between which the flange 27' is clamped. By adjusting the nuts 35 and 36, the nut 33 being loosened, the bracket 15' may be vertically adjusted with respect to the side member 31; and when the proper adjustment is obtained the nuts 35 and 36 are clamped upon the flange 27' and the nut 33 is tightened. The bracket 15', like the bracket 15 of Figs 1 to 4, inclusive, has a horizontal flange 16 which supports the sill 12 of the body. To obtain this support, a sleeve 38 projects through an opening 39 in the upper horizontal portion 40 of the side member 31, thus spacing apart the flange 16 and the sill 12; the clamping bolt 17 conveniently passes through this sleeve 38. This sleeve is not necessarily a separate member from the flange 16, though it is so shown.

I claim as my invention:

1. In combination with the sill of an automobile body and the side member of an automobile chassis, a bracket bearing against a vertical face of said side member and provided with an upper horizontal flange upon which said sill is fastened, said bracket being provided with an elongated hole, a clamping bolt passing through said hole and said side member for clamping the bracket and side member in vertically adjusted position, said bracket being provided with a lower flange, and screw means depending from said bolt and cooperating with said lower flange to produce vertical adjustment of said bracket.

2. In combination with the sill of an automobile body and the side member of an automobile chassis, a bracket bearing against a vertical face of said side member, clamping means for clamping said bracket and said member together in adjusted position, said bracket being provided with a flange upon which said sill rests, and means depending from said clamping means for producing vertical movements of said bracket with respect to said side member.

3. In combination with the sill of an automobile body and the side member of an automobile chassis, a bracket bearing against a vertical face of said side member, clamping means for clamping said bracket and side member together in adjusted position, said bracket being provided with a flange upon which said sill rests, and means for producing vertical movements of said bracket with respect to said side member.

In witness whereof I have hereunto set my hand at Indianapolis, Indiana, this 21st day of February, A. D. one thousand nine hundred and twenty-one.

CLARENCE R. IRISH.